(12) United States Patent
Yun (10) Patent No.: US 9,619,649 B1
(45) Date of Patent: Apr. 11, 2017

(54) SYSTEMS AND METHODS FOR DETECTING POTENTIALLY MALICIOUS APPLICATIONS

(71) Applicant: Symantec Corporation, Mountain View, CA (US)

(72) Inventor: James Yun, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 40 days.

(21) Appl. No.: 14/656,741

(22) Filed: Mar. 13, 2015

(51) Int. Cl.
*G06F 21/00* (2013.01)
*G06F 21/56* (2013.01)

(52) U.S. Cl.
CPC ........ *G06F 21/56* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 5,113,494 | A | 5/1992 | Menendez et al. |
| 7,328,456 | B1 | 2/2008 | Szor et al. |
| 7,620,992 | B2 | 11/2009 | Monastyrsky et al. |
| 7,874,001 | B2 * | 1/2011 | Beck ............... G06F 21/554 713/164 |
| 8,499,354 | B1 * | 7/2013 | Satish ............... G06F 9/44521 726/22 |
| 8,539,578 | B1 * | 9/2013 | Zhou ............... G06F 21/566 726/22 |
| 8,667,583 | B2 | 3/2014 | Polyakov et al. |
| 8,769,685 | B1 | 7/2014 | Conrad et al. |
| 8,839,428 | B1 | 9/2014 | Oliver et al. |
| 9,332,029 | B1 * | 5/2016 | Tikhonov ............... H04L 63/145 |
| 2002/0129264 | A1 | 9/2002 | Rowland et al. |

(Continued)

FOREIGN PATENT DOCUMENTS

GB    EP 2492833 A1 * 8/2012 ........... G06F 21/566

OTHER PUBLICATIONS

James Yun; Systems and Methods for Creating Behavioral Signatures Used to Detect Malware; U.S. Appl. No. 14/656,739, filed Mar. 13, 2015.

(Continued)

*Primary Examiner* — Farid Homayounmehr
*Assistant Examiner* — Maung Lwin
(74) *Attorney, Agent, or Firm* — FisherBroyles LLP (57) ABSTRACT

The disclosed computer-implemented method for detecting potentially malicious applications may include (1) detecting a request issued by an application running on a client device to download a file from a remote device, (2) determining that the request calls an application programming interface that enables the client device to download the file from the remote device, (3) determining that a parameter passed to the application programming interface in the request has been implicated in a previous attempt to download a known malicious file, and then in response to determining that the parameter has been implicated in a previous attempt to download a known malicious file, (4) classifying the application that issued the request as potentially malicious. Various other methods, systems, and computer-readable media are also disclosed.

20 Claims, 7 Drawing Sheets

(56) References Cited

U.S. PATENT DOCUMENTS

| | | | |
|---|---|---|---|
| 2004/0034794 A1* | 2/2004 | Mayer | G06F 21/567 726/23 |
| 2004/0064736 A1* | 4/2004 | Obrecht | G06F 21/566 726/24 |
| 2005/0265331 A1 | 12/2005 | Stolfo | |
| 2007/0094496 A1* | 4/2007 | Burtscher | G06F 21/561 713/164 |
| 2008/0016339 A1* | 1/2008 | Shukla | G06F 21/53 713/164 |
| 2008/0027891 A1 | 1/2008 | Repasi et al. | |
| 2010/0031358 A1 | 2/2010 | Elovici et al. | |
| 2010/0077481 A1* | 3/2010 | Polyakov | G06F 21/568 726/24 |
| 2010/0146589 A1* | 6/2010 | Safa | G06F 21/52 726/3 |
| 2010/0235913 A1 | 9/2010 | Craioveanu et al. | |
| 2010/0251363 A1 | 9/2010 | Todorovic | |
| 2011/0209218 A1* | 8/2011 | McRae | G06F 21/53 726/23 |
| 2012/0079596 A1* | 3/2012 | Thomas | G06F 21/55 726/24 |
| 2012/0278884 A1 | 11/2012 | Menoher | |
| 2013/0290732 A1 | 10/2013 | Branton | |
| 2013/0312098 A1 | 11/2013 | Kapoor et al. | |
| 2013/0347052 A1 | 12/2013 | Choudrie | |
| 2014/0049554 A1 | 2/2014 | Chen et al. | |
| 2014/0082751 A1* | 3/2014 | Vipat | G06F 21/629 726/30 |
| 2014/0199664 A1* | 7/2014 | Sadeh-Koniecpol | G09B 5/00 434/118 |
| 2014/0215614 A1* | 7/2014 | Beskrovny | G06F 21/51 726/23 |
| 2015/0379264 A1 | 12/2015 | Alme et al. | |

OTHER PUBLICATIONS

James Yun; Systems and Methods for Detecting Potentially Malicious Files; U.S. Appl. No. 14/666,337, filed Mar. 24, 2015.

Sean M. Hittel, et al; Systems and Methods for Detecting Text Display Manipulation Attacks; U.S. Appl. No. 14/673,902, filed Mar. 31, 2015.

"URLDownloadToFile function", https://msdn.microsoft.com/en-us/library/ie/ms775123(v=vs.85).aspx, as accessed Jan. 16, 2015, Microsoft, (On or before Jan. 16, 2015).

"How to use the URLDownloadToFile( ) Function???", http://www.cplusplus.com/forum/windows/107840/, as accessed Jan. 16, 2015, (Aug. 2, 2013).

"Should I use URLDownloadToFile?", http://stackoverflow.com/questions/5184988/should-i-use-urldownloadtofile, as accessed Jan. 16, 2015, (Mar. 3, 2011).

"URLDownloadToCacheFile function", https://msdn.microsoft.com/en-us/library/ie/ms775122(v=vs.85).aspx, as accessed Jan. 16, 2015, Microsoft, (On or before Jan. 16, 2015).

Su, Chen "Download a File Using URLDownloadToCacheFile", http://www.codeproject.com/Articles/3096/Download-a-File-Using-URLDownloadToCacheFile, as accessed Jan. 16, 2015, (Oct. 25, 2002).

"System call", http://en.wikipedia.org/wiki/System_call, as accesses Jan. 16, 2015, Wikipedia, (Jun. 17, 2004).

"How do antiviruses scan for thousands of malware signatures in a short time?", http://security.stackexchange.com/questions/30362/how-do-antiviruses-scan-for-thousands-of-malware-signatures-in-a-short-time, as accessed Jan. 16, 2015, (Feb. 6, 2013).

Martin, Luther "A clever use for U+202E", http://www.voltage.com/blog/standards/a-clever-use-for-u202e/, as accessed Jan. 16, 2015, Blog, HP Security Voltage, (Jun. 7, 2011).

"Common Malware Types: Cybersecurity 101", https://www.veracode.com/blog/2012/10/common-malware-types-cybersecurity-101, as accessed Jan. 16, 2015, Veracode, (Oct. 12, 2012).

"Antivirus software", http://en.wikipedia.org/wiki/Antivirus_software, as accessed Jan. 16, 2015, Wikipedia, (Mar. 15, 2004).

Joseph Chen; Systems and Methods for Leveraging Existing Client Computing Environments as Simulated Threat Ecosystems; U.S. Appl. No. 14/290,303, filed May 29, 2014.

* cited by examiner

SYSTEMS AND METHODS FOR DETECTING POTENTIALLY MALICIOUS APPLICATIONS

BACKGROUND

Computers are increasingly bombarded with creatively veiled invitations to download malicious content. As such, safeguarding computers from downloading malicious content remains a constant and evolving challenge. Unfortunately, traditional methods for safeguarding computers may be unable to detect all potentially malicious applications downloaded to and/or executed by the safeguarded computers. The instant disclosure, therefore, identifies a need for improved systems and methods for detecting potentially malicious applications downloaded to and/or executed by safeguarded computers.

SUMMARY

As will be described in greater detail below, the instant disclosure describes various systems and methods for detecting a potentially malicious application based at least in part on one or more parameters that the potentially malicious application passes into an Application Programming Interface (API) as part of a request to download content.

In one example, a computer-implemented method for detecting potentially malicious applications may include (1) detecting a request issued by an application running on a client device to download a file from a remote device, (2) determining that the request calls an API that enables the client device to download the file from the remote device, (3) determining that a parameter passed to the API in the request has been implicated in a previous attempt to download a known malicious file, and then in response to determining that the parameter has been implicated in a previous attempt to download a known malicious file, (4) classifying the application that issued the request as potentially malicious.

In some examples, the parameter may include and/or represent a Uniform Resource Locator (URL) that identifies the file requested for download from the remote device. Additionally or alternatively, the parameter may include and/or represent an intended target path that specifies a target location where the file is to be downloaded on the client device.

In some examples, the method may also include obtaining, from a security server, information that identifies the parameter as suspicious. In these examples, the method may further include sending the parameter to the security server for a security analysis and receiving the information that identifies the parameter as suspicious from the security server due at least in part to a result of the security analysis. Additionally or alternatively, the method may include determining, based at least in part on the information, that the parameter has been implicated in a previous attempt to download a known malicious file.

In one embodiment, the security server may create the information by obtaining, from client devices within a user base of a security vendor, information about system calls detected on the client devices. In this embodiment, the security server may identify one or more requests that call one or more APIs by analyzing the information about the systems calls detected on the client devices. For example, the security server may identify one or more requests to download a known malicious file to one or more of the client devices within the user base of the security vendor. The security server may also identify one or more parameters passed into APIs called to download a known malicious file to the client devices within the user base of the security vendor by analyzing the information about the systems calls detected on the client devices. The security server may then create the information that identifies the parameter as suspicious based at least in part on the parameters passed into the APIs.

In some examples, the method may also include creating, from the information, a signature used to detect suspicious parameters. In one example, the method may also include identifying the parameter on a blacklist. In one embodiment, the method may further include monitoring systems calls issued on the client device. In this example, the method may detect a system call that invokes the API that enables the client device to download the file from the remote device while monitoring the system calls issued on the client device.

In some examples, the method may also include hooking the API to identify any systems calls that invoke the API that enables the client device to download the file from the remote device. In one embodiment, the API may include and/or represent URLDownloadToFile and/or URLDownloadtoCacheFile.

In one example, the method may include performing one or more security actions upon classifying the application as suspicious. For example, the method may include blocking the client device from downloading the file, removing the application from the client device, warning a user of the client device that the application is potentially malicious, warning a user of the client device that the file is potentially malicious, sending a report indicating that the application is potentially malicious to a security server, sending a report indicating the file is potentially malicious to a security server, and/or sending a report indicating that the application issued a request that passed the parameter to the API to a security server.

In some examples, the method may further include uploading the parameter to a security server to enable the security server to determine whether the parameter is suspicious, add the parameter to a malicious file harvesting system, distribute information that identifies the parameter as suspicious to an additional client device within a user base of a security vendor, and/or create a signature that identifies the parameter as being implicated in a previous attempt to download a known malicious file. In one embodiment, the API may enable the client device to download files without utilizing a portal.

In one embodiment, a system for implementing the above-described method may include (1) a detection module, stored in memory, that detects a request issued by an application running on a client device to download a file from a remote device, (2) a determination module, stored in memory, that (A) determines that the request calls an API that enables the client device to download the file from the remote device and (B) determines that a parameter passed to the API in the request has been implicated in a previous attempt to download a known malicious file, (3) a classification module, stored in memory, that classifies the application that issued the request as potentially malicious in response to the determination that the parameter has been implicated in a previous attempt to download a known malicious file, and (4) a physical processor configured to execute the detection module, the determination module, and the classification module.

In some examples, the above-described method may be encoded as computer-readable instructions on a non-transitory computer-readable medium. For example, a computer-readable medium may include one or more computer-executable instructions that, when executed by a processor of a computing device, may cause the computing device to (1) detect a request issued by an application running on a client device to download a file from a remote device, (2) determine that the request calls an API that enables the client device to download the file from the remote device, (3) determine that a parameter passed to the API in the request has been implicated in a previous attempt to download a known malicious file, and then (4) classify, in response to determining that the parameter has been implicated in a previous attempt to download a known malicious file, the application that issued the request as potentially malicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting potentially malicious applications. As will be described in greater detail below, by identifying parameters that applications pass into APIs as part of requests to download malicious files, the disclosed systems and methods may classify those parameters as having been implicated in attempts to download malicious files. The disclosed systems and methods may then warn and/or notify other computing devices within a security vendor's user base to watch for those parameters in similar requests issued by applications running on those computing devices. By warning and/or notifying other computing devices within the security vendor's user base in this way, the disclosed systems and methods may be able to improve the ability of those computing devices to detect potentially malicious applications by identifying requests that pass the implicated parameters into APIs on those computing devices.

Figure 1:
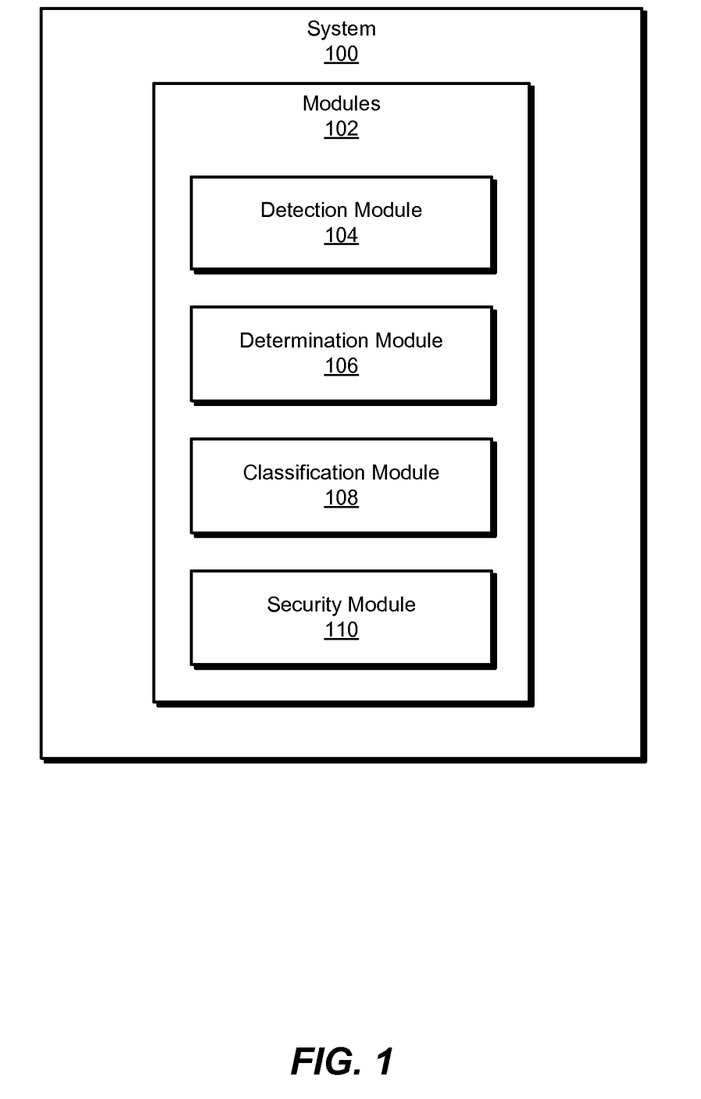
FIG. 1 is a block diagram of an exemplary system for detecting potentially malicious applications.
Figure 2:
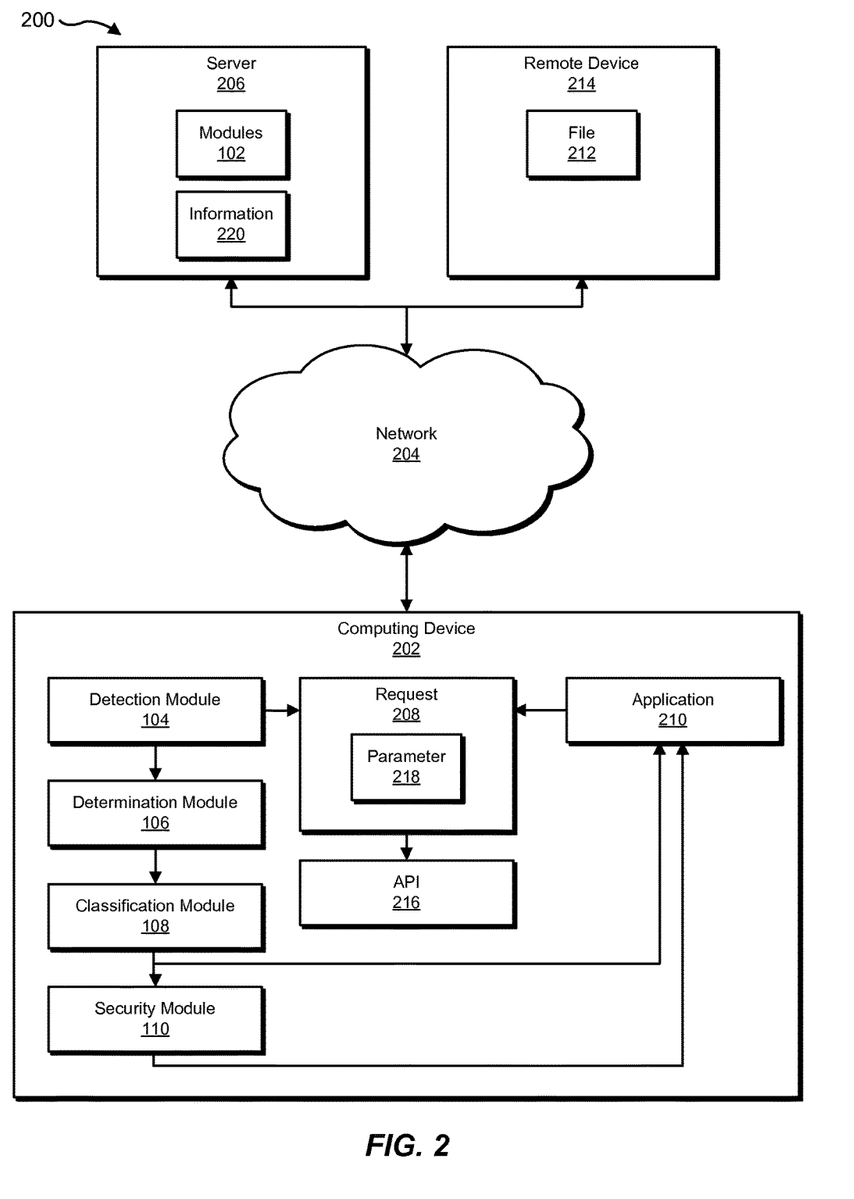
FIG. 2 is a block diagram of an additional exemplary system for detecting potentially malicious applications.
Figure 3:
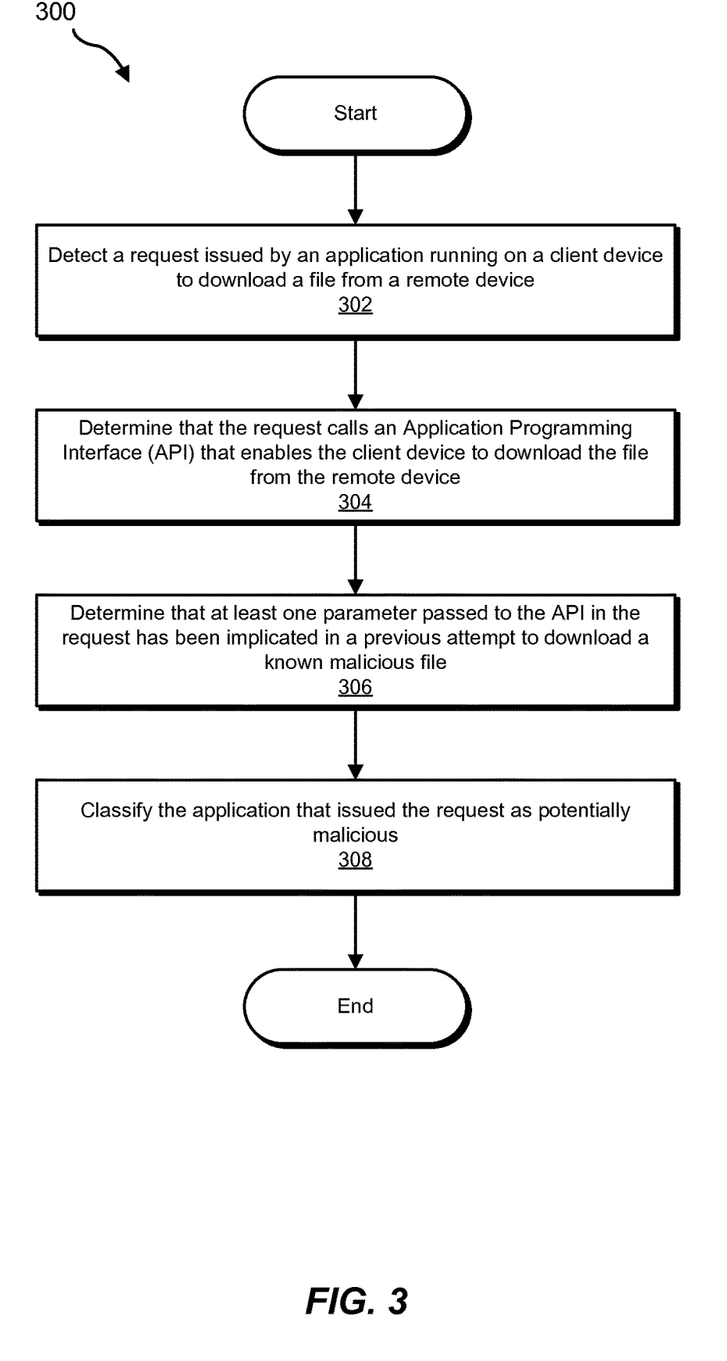
FIG. 3 is a flow diagram of an exemplary method for detecting potentially malicious applications.
Figure 4:
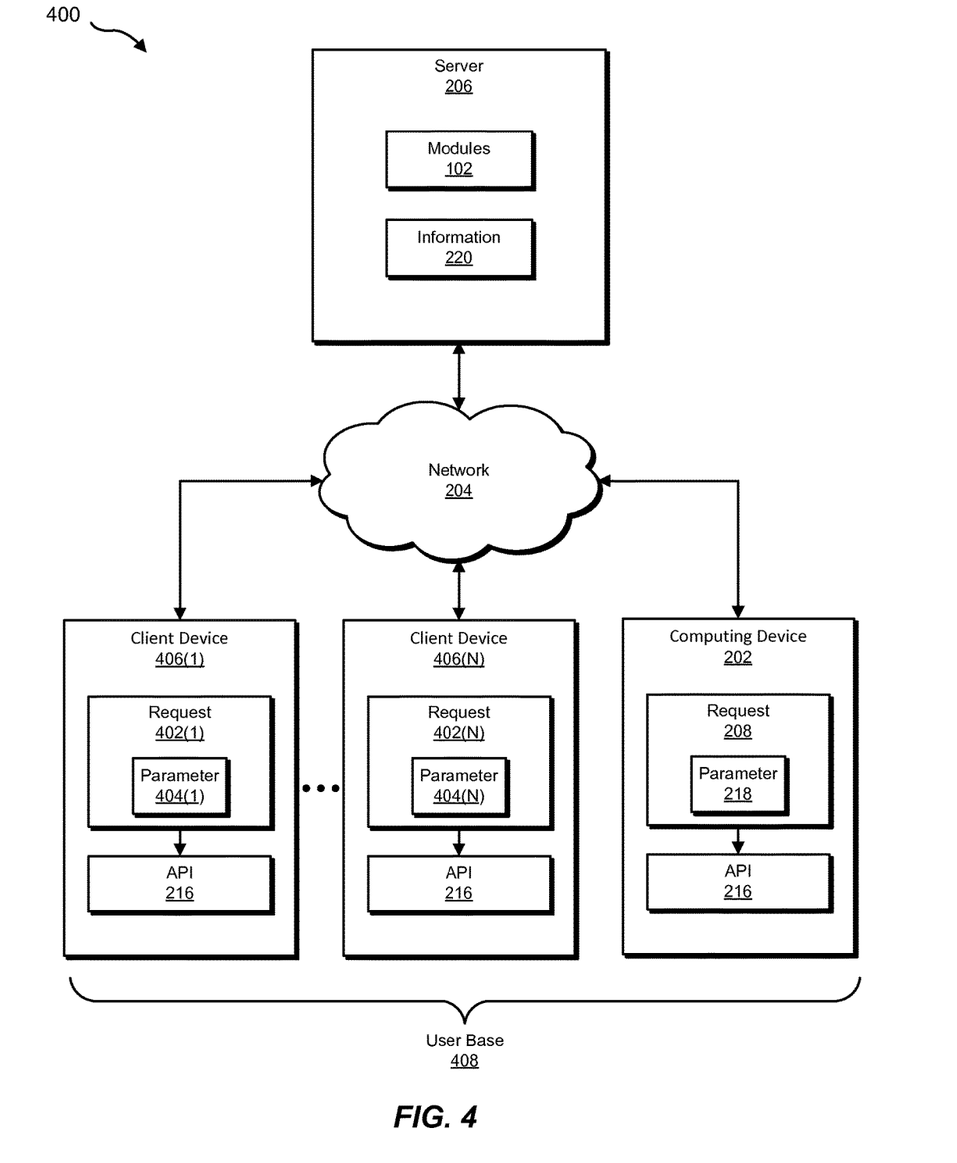
FIG. 4 is a block diagram of an exemplary computing system for detecting potentially malicious applications.

The following will provide, with reference to FIGS. 1, 2, and 4, detailed descriptions of exemplary systems for detecting potentially malicious applications. Detailed descriptions of corresponding computer-implemented methods will be provided in connection with FIG. 3. Detailed descriptions of an exemplary request and exemplary information used in detecting potentially malicious applications will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting potentially malicious applications. As illustrated in this figure, exemplary system 100 may include one or more modules 102 for performing one or more tasks. For example, and as will be explained in greater detail below, exemplary system 100 may include a detection module 104 that detect a request issued by an application running on a client device to download a file from a remote device. Exemplary system 100 may additionally include a determination module 106 that may (1) determine that the request calls an API that enables the client device to download the file from the remote device and (2) determine that a parameter passed to the API in the request has been implicated in a previous attempt to download a known malicious file. Exemplary system 100 may also include a classification module 108 that may classify, in response to the determination that the parameter has been implicated in a previous attempt to download a known malicious file, the application that issued the request as potentially malicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 and/or a remote device 214 via a network 204. In one example, computing device 202 may be programmed with one or more of modules 102. In this example, computing device 202 may also include an API 216 and an application 210 that issues a request 208 to API 216.

Additionally or alternatively, server 206 may be programmed with one or more of modules 102. In this example, server 206 may include information 220 that identifies one or more suspicious parameters. In one example, remote device 214 may include a file 212 available for download.

In one embodiment, one or more of modules 102 from FIG. 1 may, when executed by a processor of computing device 202 and/or server 206, enable computing device 202 and/or server 206 to detect potentially malicious applications. For example, and as will be described in greater detail below, detection module 104 may detect request 208 issued by application 210 to download file 212 from remote device 214. Determination module 106 may determine that request 208 calls API 216. Determination module 106 may also determine that a parameter 218 passed to API 216 in request 208 has been implicated in a previous attempt to download a known malicious file. Classification module 108 may classify application 210 as potentially malicious in response to the determination that parameter 218 has been implicated in a previous attempt to download a known malicious file. Security module 110 may then perform at least one security action to address the potentially malicious application.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In some examples, computing device 202 may represent a client device. In one example, computing device 202 may include and/or represent a device operated by a user within a security vendor's user base.

Server 206 generally represents any type or form of computing device capable of detecting malicious applications. Examples of server 206 include, without limitation, application servers, web servers, security servers, cloud-based servers, network devices, storage servers, and/or database servers configured to run certain software applications and/or provide various web, security, cloud, network, storage, and/or database services. In some examples, server 206 may be configured and/or managed by a security vendor (e.g., SYMANTEC or MCAFEE). In one example, server 206 may service customer endpoints such as computing device 202.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication among computing device 202, server 206, and/or remote device 214 in FIG. 2. Additionally or alternatively, network 204 may facilitate communication among client devices 406(1)-(N), computing device 202, and/or server 206 in FIG. 4.

API 216 generally represents any type or form of software component that enables an application of a computing system to download a file from a remote device to the computing system. In some examples, API 216 may include and/or represent a specific API function within the WINDOWS API. For example, API 216 may represent URLDownloadToFile, which is an API that enables applications of a computing system to (1) download bits from the Internet to the computing system and (2) save the bits to a file on the computing system. Additionally or alternatively, API 216 may represent URLDownloadtoCacheFile, which is an API that enables applications of a computing system to (1) download data to an Internet cache and (2) receive the file name of the Internet cache for retrieving the data.

In some examples, API 216 may represent a non-portal object that enables applications to download files to a computing system. In these examples, malicious applications may specifically attempt to download malicious files via API 216 due to API 216 operating as a non-portal (e.g., a non-browser application). Since, in these examples, API 216 is a non-portal object, malicious applications may target API 216 to avoid the malware scanning traditionally performed at portals (e.g., web browsers) prior to downloading files via those portals.

Application 210 generally represents any computer program that causes a computing system to perform certain tasks. In some examples, application 210 may include and/or represent an executable that attempts to download a file to a computing system by calling an API of the computing system. In some examples, application 210 may include and/or represent an application that attempts to download a file to a computing system without utilizing a portal. Additionally or alternatively, application 210 may include and/or represent a malicious application that initiates the download of malicious content.

Parameter 218 generally represents any type and/or form of data passed into an API as part of a request. In some examples, parameter 218 may include and/or represent data passed into an API as part of a request to download a file to a client device. In some examples, parameter 218 may include and/or represent information that the API uses to identify which file to download and where to store the downloaded file. Examples of parameter 218 include, without limitation, a URL that identifies a file requested for download, a target path that specifies a target location where the file is to be downloaded on a computing device, a caller parameter that identifies a calling component of an application requesting to download the file, variations of one or more of the same, combinations of one or more of the same, or any other suitable parameter.

Remote device 214 generally represents any type and/or form of computing device capable of maintaining, hosting, and/or distributing files. Examples of remote device 214 include, without limitation, laptops, tablets, desktops, servers, cellular phones, PDAs multimedia players, embedded systems, wearable devices, gaming consoles, combinations of one or more of the same, exemplary computing system 610 in FIG. 6, or any other suitable computing device.

File 212 generally represents any type or form of downloadable resource. In some examples, file 212 may include and/or represent a malicious content. As used herein, the term "malicious file" generally refers to any type or form of file that includes data and/or code intended to harm and/or disrupt the operations of a computing system. In some examples, file 212 may form part of a potentially unwanted program. As used herein, the term "potentially unwanted program" generally refers to a program that a user may have authorized to download to a user device without the user's informed consent. In some examples, a potentially unwanted program may be bundled with a program that the user intended to download to the user device. In these examples, the user may unknowingly have authorized downloading the potentially unwanted program to the user device at the same time as he or she authorized downloading the program that he or she intended to download to the user device.

FIG. 3 is a flow diagram of an exemplary computer-implemented method 300 for detecting potentially malicious applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may detect a request issued by an application running on a client device to download a file from a remote device. For example, detection module 104 may, as part of computing device 202 in FIG. 2, detect request 208 issued by application 210 running on computing device 202 to download file 212 from remote device 214.

Detection module 104 may detect request 208 in a variety of ways. In some examples, detection module 104 may monitor computing device 202 for certain system calls. For example, detection module 104 may monitor computing device 202 for all system calls issued by applications running on computing device 202. In another example, detection module 104 may monitor computing device 202 for any system calls directed to downloading files to computing device 202.

Additionally or alternatively, detection module 104 may monitor computing device 202 for system calls to a particular API (such as API 216). For example, detection module 104 may monitor API 216 by hooking API 216 to identify any system calls that invoke API 216. While monitoring computing device 202 in any of these ways, detection module 104 may detect request 208 issued by application 210 to download file 212 from remote device 214.

At step 304, one or more of the systems described herein may determine that the request calls an API that enables the client device to download the file from the remote device. For example, determination module 106 may, as part of computing device 202 in FIG. 2, determine that request 208 calls API 216.

Figure 5:
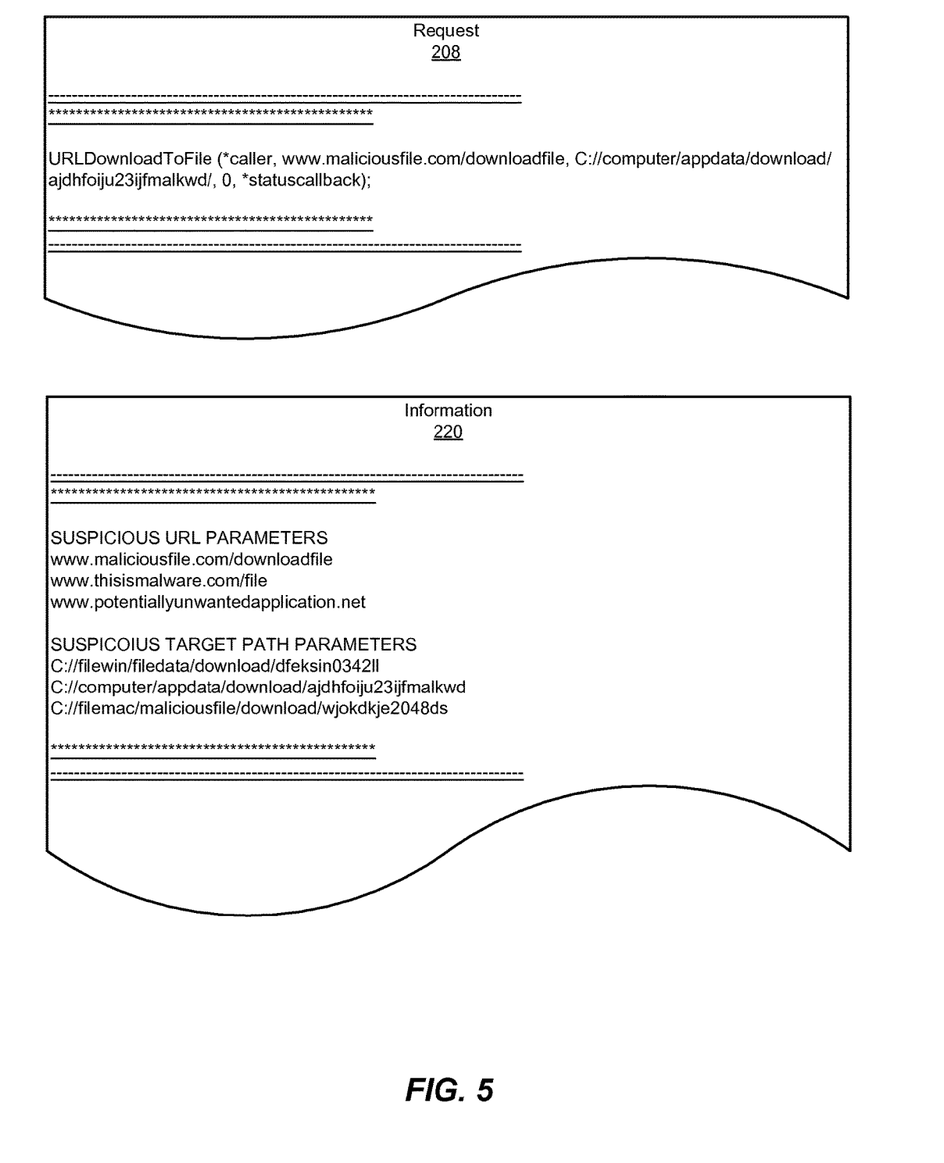
FIG. 5 is an illustration of an exemplary request and exemplary information used in detecting potentially malicious applications.

Determination module 106 may determine that request 208 calls API 216 in a variety of ways. In some examples, determination module 106 may make the determination in response to the detection of a system call to API 216. In some examples, determination module 106 may make the determination based at least in part on an analysis of request 208. For example, determination module 106 may parse request 208 in FIG. 5 to determine that request 208 invokes URLDownloadToFile. As illustrated in FIG. 5, request 208 may identify a call to an API (in this example, "URLDownloadToFile"), and one or more parameters passed to the API in the call (in this example, "*caller," "www.maliciousfile.com/downloadfile," "C://computer/appdata/download/ajdhfoiju23ijfmalkwd/," "0," and "statuscallback").

In some examples, determination module 106 may determine that request 208 calls API 216 by searching request 208 for any called APIs. For example, determination module 106 may search request 208 in an attempt to identify any API calls. During this search, determination module 106 may identify a call to API 206. In response to identifying this call, determination module 106 may determine that request 208 calls API 216.

Returning to FIG. 3, at step 306, one or more of the systems described herein may determine that a parameter passed to the API in the request has been implicated in a previous attempt to download a known malicious file. For example, determination module 106 may, as part of computing device 202 in FIG. 2, determine that parameter 218 passed to API 216 in request 208 has been implicated in a previous attempt to download a known malicious file. As used herein, the term "known malicious file" generally refers to a file that has previously been classified as malicious by a security server or user device.

Determination module 106 may determine that parameter 218 has been implicated in a previous attempt to download a known malicious file in a variety of ways. In one example, determination module 106 may determine that parameter 218 has been implicated in a previous attempt to download a known malicious file based at least in part on information 220. For example, determination module 106 may obtain information 220 from server 206 via network 204. Upon obtaining information 220 from server 206, determination module 106 may analyze information 220 and then identify parameter 218 as having been implicated in a previous attempt to download a known malicious file based at least in part on this analysis.

Additionally or alternatively, determination module 106 may determine that parameter 218 has been implicated in a previous attempt to download a known malicious file in the event that information 220 identifies parameter 218 as suspicious. Accordingly, information 220 may identify certain parameters as suspicious or even indicate that such parameters have been implicated in previous attempts to download known malicious files.

In some examples, determination module 106 may identify parameter 218 by searching request 208 for parameter 218. In these examples, request 208 may include a certain parameter at a designated location. As such, determination module 106 may identify parameter 218 by searching the designated location for such a parameter.

In one example, determination module 106 may identify parameter 218 by parsing request 208 in FIG. 5. For example, determination module 106 may, by parsing request 208 in FIG. 5, identify a URL (in this example "www.maliciousfile.com/downloadfile") passed into API 216. In this example, the URL may represent and/or point to a location at which file 212 is available for download from remote device 214. Additionally or alternatively, determination module 106 may, by parsing request 208 in FIG. 5, identify the target path passed into API 216 (in this example, "C://computer/appdata/download/ajdhfoiju23ijfmalkwd/"). In this example, the target path may represent the location to which application 210 has requested file 212 be downloaded to computing device 202.

As illustrated in FIG. 5, information 220 may include a list of suspicious URLs (in this example, "www.maliciousfile.com/downloadfile," "www.thisismalware.com/file," and "www.potentiallyunwantedapplication.net") and a list of suspicious target paths (in this example, "C://filewin/filedata/download/dfeksin0342II," "C://computer/appdata/download/ajdhfoiju23ijfmalkwd, and "C://filemac/maliciousfile/download/wjokdkje2048ds").

Server 206 may create information 220 in a variety of ways. For example, exemplary system 400 in FIG. 4 may include server 206 in communication with a user base 408 of a security vendor via network 204. The term "user base," as used herein with reference to a security vendor, generally refers to customers whose computing devices are protected by security software developed, licensed, and/or sold by a security vendor. In some examples, the computing devices included in user base 408 may receive certain security services from the security vendor. Additionally or alternatively, the computing devices included in user base 408 may provide information about the computing devices' activities, files, and/or downloads to the security vendor for analysis.

As illustrated in FIG. 4, user base 408 may include client devices 406(1)-(N) as well as computing device 202. In one example, server 206 may create information 220 by collecting and/or analyzing security data from user base 408. For example, server 206 may create information 220 based at least in part on data about system calls collected from one or more of client devices 406(1)-(N) included in user base 408.

In one example, server 206 may obtain the data about the system calls from security agents running on client devices 406(1)-(N). In this example, the security agents may monitor all system calls made on client devices 406(1)-(N). For example, the security agents may monitor system calls made to APIs that facilitate downloading files. As a specific example, the security agents may monitor system calls made to API 216 located on each of client devices 406(1)-(N). The security agents may also send information about the system calls made to API 216 to server 206 for analysis.

In some examples, server 206 may analyze the data about the system calls to identify one or more requests 402(1)-(N) that call one or more APIs 406(1)-(N) of client devices 406(1)-(N). In these examples, server 206 may further identify parameters 404(1)-(N) passed into APIs 406(1)-(N) by requests 402(1)-(N). In some embodiments, server 206 may determine that a certain subset of requests 402(1)-(N) may be requesting to download malicious files. In these embodiments, server 206 may create information 220 based on a subset of parameters 404(1)-(N) corresponding to the subset of requests 402(1)-(N). For example, server 206 may classify one or more of the parameters within the subset of parameters 404(1)-(N) as suspicious.

In one example, information 220 may identify those parameters in a list of suspicious parameters. For example, information 220 may identify those parameters in a blacklist. In some examples, server 206 may additionally or alternatively create a signature used to detect suspicious parameters. In these examples, server 206 may create the signature based at least in part on those parameters.

Determination module 106 may receive information 220 from server 206 in a variety of ways. In some examples, determination module 106 may receive a blacklist that includes and/or incorporates at least a portion of information 220. Additionally or alternatively, determination module 106 may receive a signature created from information 220. In one example, determination module 106 may receive information 220 by receiving information that only includes a description of parameter 218.

In some examples, determination module 106 may receive information 220 in response to sending parameter 218 to server 206 for a security analysis. For example, determination module 106 may receive information 220 as part of receiving the security analysis from server 206. In one example, the security analysis may designate parameter 218 as suspicious. In this example, determination module 106 may determine that parameter 218 has been implicated in a previous attempt to download a known malicious file based on the designation.

In some examples, determination module 106 may scan information 220 to identify any suspicious parameters. As a specific example, determination module 106 may scan the list of "suspicious URL parameters" included in information 220 in FIG. 5 and identify an entry for "www.maliciousfile.com/downloadfile." By identifying this entry in information 220 in FIG. 5, determination module 106 may determine that "www.maliciousfile.com/downloadfile" is a suspicious URL. As a result, determination module 106 may determine that the URL passed into API 216 by request 208 has been implicated in a previous attempt to download a known malicious file.

In additional or alternative examples, information 220 may include a list of one or URL characteristics that are suspicious. In this example, determination module 106 may determine that the URL parameter passed into API 216 by request 208 is suspicious based on a characteristic of the URL parameter matching one or more parameters included in the list of suspicious URL characteristics.

In some examples, determination module 106 may scan the list of "suspicious target path parameters" included in information 220 in FIG. 5 and identify an entry for "C://computer/appdata/download/ajdhfoiju23ijfmalkwd/." By identifying this entry in information 220 in FIG. 5, determination module 106 may determine that "C://computer/appdata/download/ajdhfoiju23ijfmalkwd/" is a suspicious target path. As a result, determination module 106 may determine that the target path passed into API 216 by request 208 has been implicated in a previous attempt to download a known malicious file.

In additional or alternative examples, information 220 may include a list of one or more target path characteristics that are suspicious. In this example, determination module 106 may determine that the target path parameter passed into API 216 by request 208 is suspicious based on a characteristic of the target path parameter matching one or more parameters included in the list of suspicious URL characteristics.

Returning to FIG. 3, at step 308, one or more of the systems described herein may classify the application that issued the request as potentially malicious in response to determining that the parameter has been implicated in a previous attempt to download a known malicious file. For example, classification module 108 may, as part of computing device 202 in FIG. 2, classify application 210 that issued request 208 as potentially malicious in response to the determination that parameter 218 has been implicated in a previous attempt to download a known malicious file.

Classification module 108 may classify application 210 as potentially malicious in a variety of ways. In one example, classification module 108 may classify application 210 as potentially malicious in response to the determination that parameter 218 has been implicated in a previous attempt to download a known malicious file. In some examples, classification module 108 may classify application 210 by assigning a discrete descriptor to application 210 (e.g., "malicious" or "safe"). Additionally or alternatively, classification module 108 may classify application 210 by assigning a score to application 210 (e.g., a score between 1 and 10 where a score of 1 signifies likely safe and a score of 10 signifies likely malicious).

In some examples, security module 110 may perform a variety of operations in response to the classification of application 210 as potentially malicious. In some examples, security module 110 may perform an operation affecting file 212. For example, security module 110 may block computing device 202 from downloading file 212. As another example, security module 110 may warn a user of computing device 202 that file 212 is potentially malicious. As a further example, security module 110 may create a report indicating that file 212 is potentially malicious. In some examples, security module 110 may send the report to server 206. Sending the report to server 206 may, in some embodiments, enable server 206 to create information used to identify future malware threats within user base 408.

In some examples, security module 110 may perform an operation affecting application 210 in response to the classification of application 210 as potentially malicious. In one example, security module 110 may remove application 210 from computing device 202. For example, security module 110 may uninstall application 210 from computing device 202. In some embodiments, security module 110 may automatically remove application 210 from computing device 202. Additionally or alternatively, security module 110 may prompt a user of computing device 202 to remove application 210 from computing device 202.

In another example, security module 110 may warn the user of computing device 202 that application 210 may potentially be malicious. In some examples, warning the user may include prompting the user to remove application 210. In another example, security module 110 may send, to server 206, a report indicating that the application is potentially malicious. Sending the report to server 206 may, in some embodiments, enable server 206 to create information used to identify future malware threats within user base 408.

In some examples, security module 110 may upload parameter 218 to server 206. In these examples, as illustrated in FIG. 4, computing device 202 may form part of user base 408. Also in these examples, server 206 may monitor computing device 202 in the same manner that server 206 monitors client devices 406(1)-(N), as described in connection with step 306. In one example, server 206 may utilize information obtained by analyzing parameter 218 together with information previously obtained by analyzing system calls invoked on client devices 406(1)-(N). In one example, server 206 may add parameter 218 to a malicious file harvesting system in response to receiving parameter 218 from security module 110. In these examples, the malicious file harvesting system may then identify malicious files, or create rules for identifying malicious files, based at least in part on information derived from an analysis of parameter 218.

In some examples, server 206 may designate parameter 218 as suspicious in response to receiving parameter 218 from security module 110. In these examples, server 206 may then distribute information that identifies parameter 218 as suspicious to an additional client device. For example, server 206 may distribute the information that identifies parameter 218 as suspicious to client devices 406(1)-(N) within user base 408. In some embodiments, server 206 may distribute the information that identifies parameter 218 as suspicious by creating a signature that identifies parameter 218 as suspicious and then distributing the signature. Additionally or alternatively, server 206 may distribute the information that identifies parameter 218 as suspicious by creating a blacklist of suspicious parameters that includes parameter 218 and then distributing the blacklist.

As described above, the systems and methods described herein may identify parameters passed into an API as part of a request from an application to download a file. The disclosed systems and methods may then designate the identified parameters as suspicious and use the identified parameters to identify future attempts to download malicious files. Thus, by analyzing parameters passed into an API as part of a request to download a file, the disclosed systems and methods may identify future attempts to download malicious files. By identifying attempts to download malicious files in this way, the disclosed systems and methods may identify malicious files without scanning the files to identify malicious content and/or in addition to scanning the files. Moreover, the disclosed systems and methods may be able to determine that the application is potentially malicious based at least in part on the request since the application issued the request to download the file using the suspicious parameters.

Figure 6:
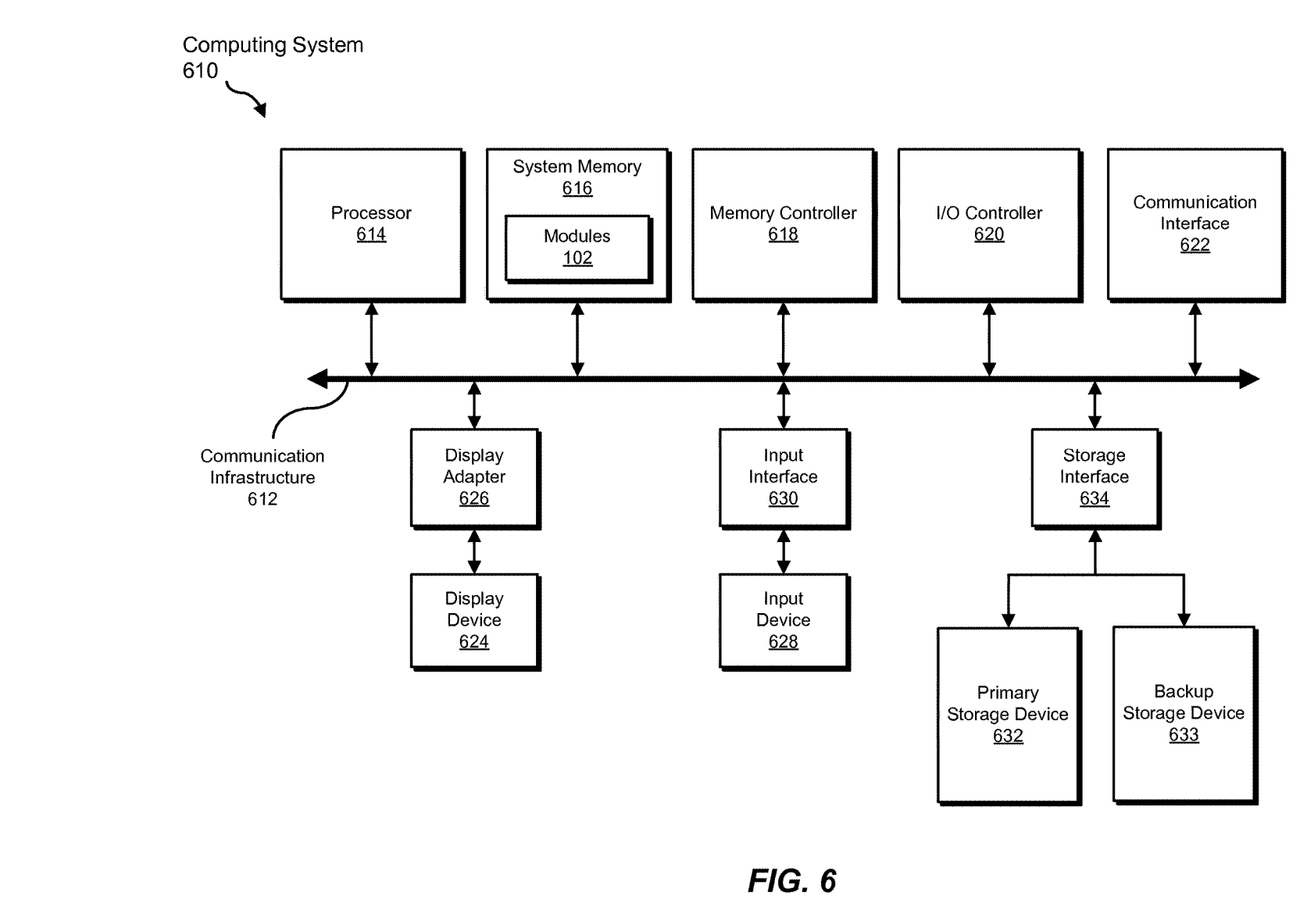
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include a processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
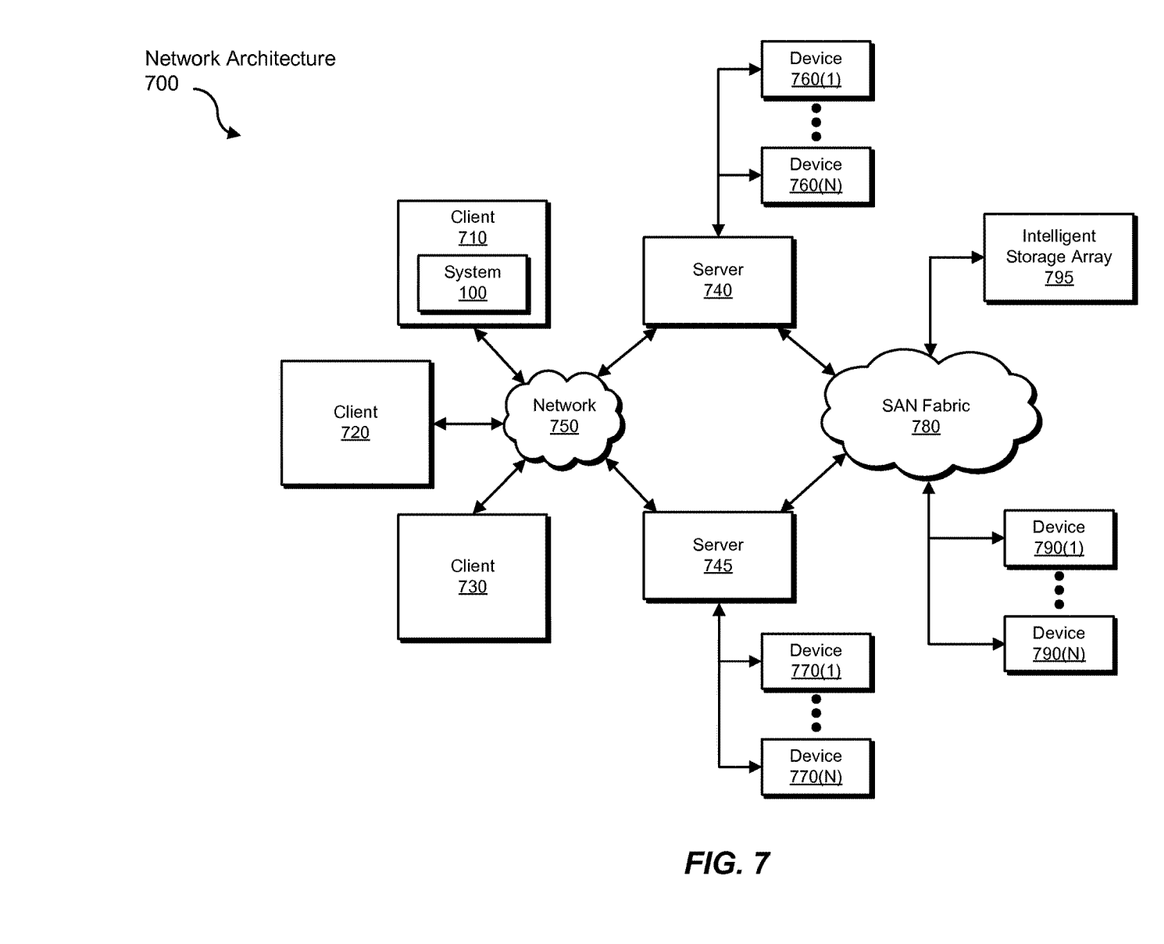
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting potentially malicious applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform information describing a parameter passed into an API as part of a request to download a file into a malware classification. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting potentially malicious applications, at least a portion of the method being performed by a computing system comprising at least one computer processor, the method comprising:
    detecting a request issued by an application running on a client device to download a file from a remote device;
    determining that the request calls an Application Programming Interface (API) that enables the client device to download the file from the remote device;
    identifying at least one parameter passed to the API in the request;

sending the parameter to a security server for a security analysis;
receiving, from the security server, information that indicates that the parameter has been implicated in a previous attempt to download a known malicious file, wherein the security server creates the information by:
obtaining, from a plurality of client devices within a user base of a security vendor, information about system calls detected on the plurality of client devices;
identifying, by analyzing the information about the system calls detected on the plurality of client devices:
one or more requests that call one or more APIs to download a known malicious file to one or more of the client devices within the user base of the security vendor; and
one or more parameters passed into the APIs called to download a known malicious file to the client devices within the user base of the security vendor; and
creating the information that identifies the parameter as having been implicated in a previous attempt to download a known malicious file based at least in part on the parameters passed into the APIs called to download a known malicious file to the client devices within the user base of the security vendor;
determining, based at least in part on the information received from the security server, that the parameter has been implicated in a previous attempt to download a known malicious file; and
classifying, in response to determining that the parameter has been implicated in a previous attempt to download a known malicious file, the application that issued the request as potentially malicious.

2. The computer-implemented method of claim 1, wherein the parameter comprises a Uniform Resource Locator that identifies the file requested for download from the remote device.

3. The computer-implemented method of claim 1, wherein the parameter comprises an intended target path that specifies a target location where the file is to be downloaded on the client device.

4. The computer-implemented method of claim 1, wherein the security server distributes, to at least one additional client device within the user base of the security vendor, information that identifies the parameter as suspicious.

5. The computer-implemented method of claim 1, wherein the user base of the security vendor comprises the client device.

6. The computer-implemented method of claim 1, wherein the security server creates the information that identifies the parameter as having been implicated in a previous attempt to download a known malicious file by creating a signature used to detect suspicious parameters.

7. The computer-implemented method of claim 6, wherein receiving, from the security server, the information that indicates that the parameter has been implicated in a previous attempt to download a known malicious file comprises receiving, from the security server, the signature used to detect suspicious parameters.

8. The computer-implemented method of claim 1, wherein determining that the parameter has been implicated in a previous attempt to download a known malicious file comprises identifying the parameter on a blacklist.

9. The computer-implemented method of claim 1, further comprising:
monitoring systems calls issued on the client device;
wherein detecting the request comprises, while monitoring the system calls issued on the client device, detecting a system call that invokes the API that enables the client device to download the file from the remote device.

10. The computer-implemented method of claim 9, wherein monitoring the system calls issued on the client device comprises hooking the API to identify any systems calls that invoke the API.

11. The computer-implemented method of claim 1, wherein the API comprises at least one of:
URLDownloadToFile; and
URLDownloadtoCacheFile.

12. The computer-implemented method of claim 1, further comprising, upon classifying the application as suspicious, at least one of:
blocking the client device from downloading the file;
removing the application from the client device;
warning a user of the client device that the application is potentially malicious;
warning a user of the client device that the file is potentially malicious;
sending, to the security server, a report indicating that the application is potentially malicious;
sending, to the security server, a report indicating the file is potentially malicious; and
sending, to the security server, a report indicating that the application issued a request that passed the parameter to the API.

13. The computer-implemented method of claim 1, wherein, upon creating the information that identifies the parameter as having been implicated in a previous attempt to download a known malicious file, the security server adds the parameter to a malicious file harvesting system.

14. The computer-implemented method of claim 1, wherein the API enables the client device to download files without utilizing a portal.

15. A system for detecting potentially malicious applications, the system comprising:
a memory;
a detection module, stored in memory, that detects a request issued by an application running on a client device to download a file from a remote device;
a determination module, stored in memory, that:
determines that the request calls an Application Programming Interface (API) that enables the client device to download the file from the remote device;
identifies at least one parameter passed to the API in the request;
sends the parameter to a security server for a server analysis;
receives, from the security server, information that indicates that the parameter has been implicated in a previous attempt to download a known malicious file, wherein the security server creates the information by:
obtaining, from a plurality of client devices within a user base of a security vendor, information about system calls detected on the plurality of client devices;
identifying, by analyzing the information about the system calls detected on the plurality of client devices:

one or more requests that call one or more APIs to download a known malicious file to one or more of the client devices within the user base of the security vendor; and
one or more parameters passed into the APIs called to download a known malicious file to the client devices within the user base of the security vendor; and
creating the information that identifies the parameter as having been implicated in a previous attempt to download a known malicious file based at least in part on the parameters passed into the APIs called to download a known malicious file to the client devices within the user base of the security vendor; and
determines, based at least in part on the information received from the security server, that the parameter has been implicated in a previous attempt to download a known malicious file;
a classification module, stored in memory, that classifies, in response to the determination that the parameter has been implicated in a previous attempt to download a known malicious file, the application that issued the request as potentially malicious; and
at least one physical processor configured to execute the detection module, the determination module, and the classification module.

16. The system of claim 15, wherein the parameter comprises a Uniform Resource Locator that identifies the file requested for download from the remote device.

17. The system of claim 15, wherein the parameter comprises an intended target path that specifies a target location where the file is to be downloaded on the client device.

18. The system of claim 15, wherein the security server distributes, to at least one additional client device within the user base of the security vendor, information that identifies the parameter as suspicious.

19. The system of claim 15, wherein the user base of the security vendor comprises the client device.

20. A non-transitory computer-readable medium comprising one or more computer-readable instructions that, when executed by at least one processor of a computing device, cause the computing device to:

detect a request issued by an application running on a client device to download a file from a remote device;
determine that the request calls an application programming interface that enables the client device to download the file from the remote device;
identify at least one parameter passed to the API in the request;
send the parameter to a security server for a server analysis;
receive, from the security server, information that indicates that the parameter has been implicated in a previous attempt to download a known malicious file, wherein the security server creates the information by:
obtaining, from a plurality of client devices within a user base of a security vendor, information about system calls detected on the plurality of client devices;
identifying, by analyzing the information about the system calls detected on the plurality of client devices:
one or more requests that call one or more APIs to download a known malicious file to one or more of the client devices within the user base of the security vendor; and
one or more parameters passed into the APIs called to download a known malicious file to the client devices within the user base of the security vendor; and
creating the information that identifies the parameter as having been implicated in a previous attempt to download a known malicious file based at least in part on the parameters passed into the APIs called to download a known malicious file to the client devices within the user base of the security vendor;
determine, based at least in part on the information received from the security server, that the parameter has been implicated in a previous attempt to download a known malicious file; and
classify, in response to determining that the parameter has been implicated in a previous attempt to download a known malicious file, the application that issued the request as potentially malicious.

\* \* \* \* \*